United States Patent [19]

Matsuda

[11] Patent Number: 4,665,603
[45] Date of Patent: May 19, 1987

[54] METHOD AND APPARATUS FOR FORMING A ROW OF ZIGZAG COUPLING ELEMENTS FOR SLIDE FASTENERS

[75] Inventor: Yasuhiko Matsuda, Toyama, Japan
[73] Assignee: Yoshida Kogyo K. K., Tokyo, Japan
[21] Appl. No.: 845,518
[22] Filed: Mar. 28, 1986

[30] Foreign Application Priority Data

Apr. 2, 1985 [JP] Japan .................... 60-68430

[51] Int. Cl.⁴ ............... B21D 53/52; A41H 37/06; B29D 5/00
[52] U.S. Cl. .................. 29/410; 29/769; 29/33.2; 425/814
[58] Field of Search ......... 264/252, 280, 284, 285, 264/295; 425/391, 814; 29/408–410, 766–770, 33.2

[56] References Cited

U.S. PATENT DOCUMENTS

| | | | |
|---|---|---|---|
| 3,054,149 | 9/1962 | Streicher | 18/56 |
| 3,594,865 | 7/1971 | Erb | 425/814 |
| 3,672,805 | 6/1972 | Perepp | 425/814 |
| 3,688,805 | 9/1972 | Moertel | 425/391 |
| 3,770,361 | 11/1973 | Heimberger | 425/391 |
| 4,182,600 | 1/1980 | Moertell | 425/814 |
| 4,251,912 | 2/1981 | Yoshida | 425/814 |

FOREIGN PATENT DOCUMENTS 669722 9/1963 Canada .................... 29/12
59-125506 7/1984 Japan .

Primary Examiner—Howard N. Goldberg
Assistant Examiner—Steven Nichols
Attorney, Agent, or Firm—Hill, Van Santen, Steadman & Simpson

[57] ABSTRACT

In a method and apparatus for forming a row of zigzag coupling elements, the entire rotating die wheel is heated by a built-in interior heater so as to remain at a temperature slightly lower than the temperature at which a monofilament of thermoplastic synthetic resin is deformable, the monofilament being folded in an annular peripheral groove of the die wheel into a row of U-shaped coupling element blanks. Then, immediately before coupling heads are shaped, the monofilament in the form of U-shaped coupling element blanks received in the annular peripheral groove is additionally heated locally by an exterior heater outside of the die wheel such that its temperature rises to a heat setting temperature.

12 Claims, 10 Drawing Figures

METHOD AND APPARATUS FOR FORMING A ROW OF ZIGZAG COUPLING ELEMENTS FOR SLIDE FASTENERS

BACKGROUND OF THE INVENTION

1. Field of the Invention

The present invention relates generally to the production of slide fasteners, and more particularly to a method of and an apparatus for forming a row of continuous zigzag coupling elements for slide fasteners from a filament of thermoplastic synthetic resin.

2. Description of the Prior Art

Canadian Patent No. 669,722 and Japanese Patent Laid-Open Publication No. 59-125506 disclose a coupling-element forming apparatus which comprises a heated die wheel having an annular central groove in its peripheral surface and a pair of rows of circumferentially staggered pins disposed one row on each side of the groove. This prior apparatus also comprises a series of working units, i.e. a winding unit for winding a monofilament of thermoplastic synthetic resin around the pins in a zigzag form across the groove, a bending unit for forcing the zigzag monofilament into the groove to form a row of zigzag coupling element blanks having parallel legs interconnected at their lower ends by lower connecting portions, a punching unit for compressing the lower connecting portions against the bottom of the groove to form coupling heads each having a pair of lateral projections, a hammering unit (as occasion demands) for bending upper end portions of the parallel legs laterally outwardly away from each other to form raised connecting portions interconnecting adjacent coupling element blanks, and a discharging unit for removing the thus finalized coupling elements from the die wheel, these working units being arranged around the peripheral surface of the die wheel in this order. Further, a heating means, such as an electric heater or a low-frequency induction heater, is mounted in the die wheel for heating the whole thereof to a temperature suitable for heat-setting of the monofilament.

The discharging unit includes a scraper having a distal end touching the bottom of the annular peripheral groove of the die wheel. Immediately before it is discharged, the monofilament in the shape of coupling elements is instantanously heat set by blowing a stream of outside air onto it. However, because the monofilament about to be discharged is still soft at the heat setting temperature due to the heated die wheel, coupling heads formed on the monofilament would be objectionably deformed due to the contact with the distal end of the scraper. Thus objectionably deformed coupling heads would cause staggered inter-element pitches while being exposed to the stream of outside air.

SUMMARY OF THE INVENTION

It is therefore an object of the present invention to provide a method of and an apparatus for forming a row of zigzag coupling elements, in which a monofilament of thermoplastic synthetic resin can be shaped into the final form of coupling elements easily and stably and in which the coupling elements of the final shape can be discharged from a heated die wheel without being objectionably deformed. Consequently the present invention enables an improved rate of production.

According to the present invention, the entire die wheel is heated by a built-in interior heater so as to remain at the temperature at which a monofilament of thermoplastic synthetic resin is deformable, the monofilament being folded in an annular peripheral groove of the die wheel into a row of U-shaped coupling element blanks. Then, immediately before coupling heads are shaped, the monofilament (in the form of U-shaped coupling element blanks received in the annular peripheral groove) is additionally heated locally by an exterior heater outside of the die wheel such that its temperature rises to a heat setting temperature.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
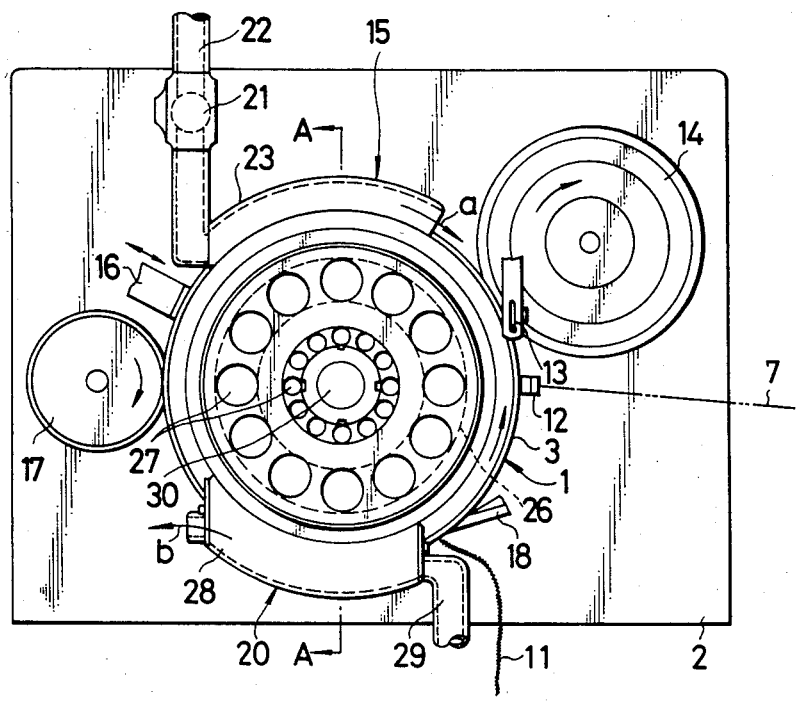
FIG. 1 is a side elevational view of an apparatus for forming a row of zigzag coupling elements according to the present invention.

As shown in FIG. 1, an apparatus for forming a row of continuous zigzag coupling elements 11 for slide fasteners includes a die wheel 1 mounted on a frame 2 for rotation by a suitable drive (not shown). The die wheel 1 has an annular central groove 5 in its peripheral surface 3, and a pair of rows of circumferentially staggered pins 4, 4 disposed one row on each side of the groove 5, as shown in FIGS. 2A, 3A, 4A, and 5A, there being a pair of rows of circumferentially staggered projections 6, 6 on opposite side walls of the groove 5.

Figure 2A:
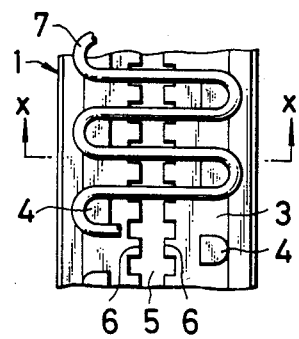
FIGS. 2A, 3A, 4A and 5A are fragmentary enlarged plan views of a die wheel, illustrating the manner in which a monofilament is progressively shaped into a row of zigzag coupling elements.
Figure 3A:
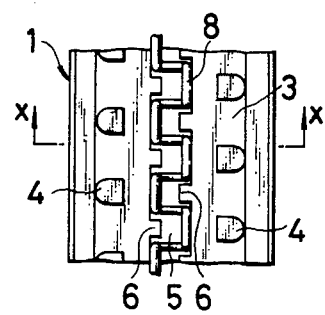
Figure 3B:
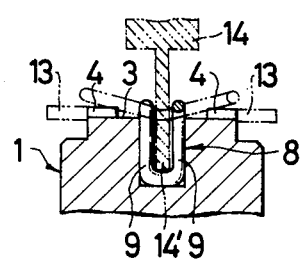

The apparatus also includes a winding unit 12 for winding a monofilament 7 of thermoplastic synthetic resin, such as polyester and polyamide, alternately around the pins 4,4 across the groove 5 in a zigzag form (FIG. 2A), a lifting unit 13 for lifting the zigzag monofilament 7 away from the pins 4 (FIG. 3B), and a bending unit 14 in the form of a rotary disk for forcing the lifted zigzag monofilament 7 into the groove 5 to form a row of zigzag coupling element blanks 8 having parallel legs 9,9 interconnected at their lower ends by lower connecting portions (FIGS. 3A and 3B).

The apparatus also includes a punching unit 16 for compressing or deforming each lower connecting portion to form a coupling head 10 having a pair of lateral projections (FIGS. 4A and 5A), a hammering unit 17 for bending upper end portions of the parallel legs 9,9 laterally outwardly away from each other to form raised connecting portions 9',9' interconnecting adjacent coupling element blanks 8 (FIGS. 5A and 5B), and a discharging unit 18 for removing the thus finalized coupling elements 11 from the die wheel 1. The discharging unit 18 is in the form of a scraper having a distal end touching the bottom of the groove 5. The peripheral surface 3 of the die wheel 1 is additionally (as described below) heated locally by an exterior heater 15 disposed on the upper side of the die wheel 1 for heat setting the monofilament 7 in the form of U-shaped coupling element blanks 8, and is cooled locally by a cooling unit 20 disposed on the lower side of the die wheel 1.

According to the types of coupling elements, the hammering unit 17 may be omitted, and according to the conditions for temperature, the cooling unit 20 also may be omitted.

Figure 6:
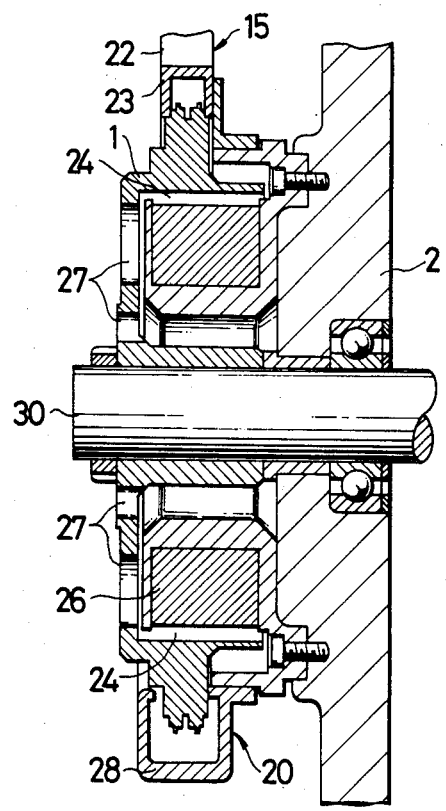
FIG. 6 is an enlarged cross-sectional view taken along line A—A of FIG. 1.

As shown in FIGS. 1 and 6, the die wheel 1 is fixedly mounted on a shaft 30 rotatably supported on the frame 2 and has a cavity 24 within which an interior heater 26 is disposed for heating the entire die wheel 1 so as to maintain its temperature slightly lower than the temperature at which the monofilament 7 is deformable. The interior heater 26 comprises a low-frequency electromagnetic induction coil fixedly mounted on the frame 2. Alternatively, the interior heater 26 may be an electric heater or a heat-medium circulating heater.

The die wheel 1 has in its one side surface a number of openings 27 communicating with the cavity 24 for radiation purposes.

Also as shown in FIGS. 1 and 6, the exterior heater 15 is disposed in confronting relation to the peripheral surface 3 of the die wheel 1 and includes a blast pipe 22 for heated air, and a cover 23 of generally C-shaped cross section connected to the blast pipe 22 and enclosing an upper portion of the peripheral surface 3. The cover 23 is closed at one end (left in FIG. 1) adjacent to the punching unit 16 and is open at the other end (right in FIG. 1) adjacent to the bending unit 14 so that the heated air introduced from the blast pipe 22 flows from the punching-unit end to the bending-unit end in the direction of an arrow a. A change-over valve 21 is mounted in the blast pipe 22 for discharging heated air upon termination of the operation of the apparatus.

Likewise, the cooling unit 20 is disposed in confronting relation to the peripheral surface 3 of the die wheel 1 and includes a blast pipe 29 for outside air, and a cover 28 of generally C-shaped cross section connected to the blast pipe 29 and enclosing a lower portion of the peripheral surface 3. The cover 28 is closed at one end (right in FIG. 1) adjacent to the discharging unit 18 and is open at the other end (left in FIG. 1) adjacent to the hammering unit 17 so that the outside air introduced from the blast pipe 29 flows from the discharging-unit end to the hammering-unit end in the direction of an arrow b opposite to the direction of rotation of the die wheel 1.

Figure 2B:
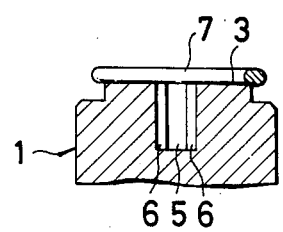
FIGS. 2B, 3B, 4B and 5B are cross sectional views taken along line X—X of FIGS. 2A, 3A, 4A and 5A, respectively.

The method of the present invention is carried out on the above-described apparatus in the following manner:

Firstly, a monofilament 7 of thermoplastic synthetic resin, e.g. polyethylene terephthalate, is wound alternately around the pins 4 across the central groove 5 in the peripheral surface 3 of the die wheel 1 in a zigzag form (FIGS. 2A and 2B). Then the zigzag monofilament 7 is lifted away from the pins 4 by the lifting unit 13 and is subsequently forced into the central groove 5 so as to be shaped into a row of folded U-shaped coupling element blanks 8 having parallel legs 9,9 interconnected at their lower ends by lower connecting portions (FIGS. 3A and 3B). During that time, as described below, the monofilament 7 is heated by the interior heater 26 at a constant temperature slightly lower than the characteristic temperature at which the particular monofilament 7 is deformable.

Figure 4A:
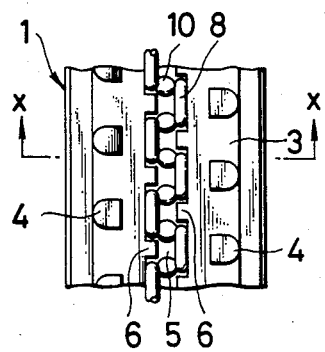
Figure 4B:
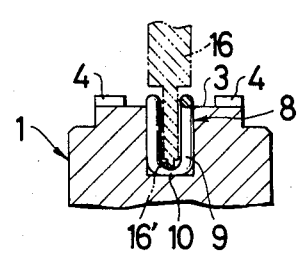

The monofilament 7, in the form of the thus U-shaped coupling element blanks 8 retained in the groove 5, is additionally heated locally by the exterior heater 15 such that its temperature rises to a heat setting temperature, whereupon the lower connecting portions of the U-shaped coupling element blanks 8 are compressed or deformed, by a reciprocable punch head 16' of the punching unit 16, into the shape of coupling heads 10 each having a pair of lateral projections (FIGS. 4A and 4B).

Figure 5A:
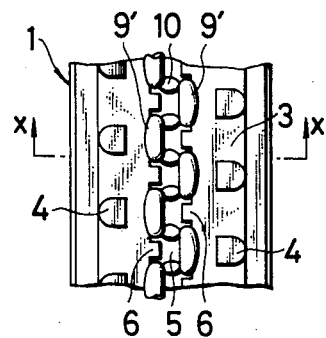
Figure 5B:
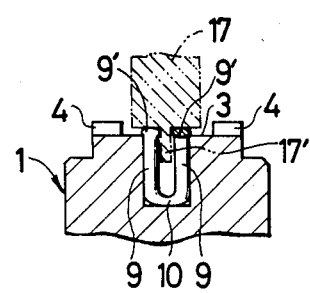

Subsequently, the opposed upper end portions of the parallel legs 9,9 of the coupling element blanks 8 projecting from the central groove 5, by means of stepped portions of a rotary hammer head 17' of the hammering unit 17, are bent laterally outwardly away from each other to form raised connecting portions 9', 9' (FIGS. 5A and 5B). Thus the row of zigzag coupling elements 11 of a final shape has been provided.

Finally, this row of zigzag coupling elements 11 retained in the groove 5 is removed and discharged from the peripheral surface 3 of the die wheel 1 by the scraper of the discharging unit 18 after having been cooled by the cooling unit 20. Thus a single cycle of coupling-element formation has been completed.

During the above coupling-element forming operation, the rotating die wheel 1 is heated by the interior heater 26 so as to remain at a constant temperature ranging from 60° C. to 70° C. which is slightly lower than the characteristic deforming temperature of polyethylene terephthalate.

Immediately before the coupling heads 10 are formed, the monofilament 7 in the form of U-shaped coupling element blanks 8 is locally heated up to the characteristic heat setting temperature of polyethylene terephthalate by the exterior heater 15 through which heated air at a temperature ranging from about 120° C. to about 130° C. is blown.

According to the present invention, it is possible to shape a monofilament of thermoplastic synthetic resin into the predetermined final form of coupling elements easily and stably. Also the coupling elements in the predetermined shape can be discharged from the die wheel without being objectionably deformed. Consequently the present invention is particularly suitable for high-speed production of a continuous row of zigzag coupling elements.

Although various minor modifications may be suggested by those versed in the art, it whould be understood that I wish to embody within the scope of the patent warranted hereon, all such embodiments as reasonably and properly come within the scope of my contribution to the art.

What is claimed is:

1. A method of forming a row of continuous zigzag coupling elements for slide fasteners on a rotating die wheel having an annular groove in its peripheral surface, and a pair of rows of circumferentially staggered pins, disposed one row on each side of said groove, said method comprising the steps of:
    (a) heating said die wheel from its inside such that, throughout the coupling element formation, the whole of said die wheel remains at a predetermined temperature slightly lower than the temperature at which a monofilament of thermoplastic synthetic resin is deformable;
    (b) winding the monofilament alternately around the pins across the annular groove in a zigzag form;

(c) forcing the zigzag monofilament into the annular groove so as to shape the same into a row of folded U-shaped zigzag coupling element blanks having parallel legs interconnected at their lower ends by lower connecting portions;

(d) compressing the lower portions of the U-shaped coupling element blanks into the shape of coupling heads to thereby put the coupling element blanks in a final form of the coupling elements; and (e) immediately before said compressing, additionally heating the die wheel locally from its outside such that the temperature of the monofilament in the form of U-shaped coupling element blanks rises to a characteristic heat setting temperature of the thermoplastic synthetic resin of the monofilament.

2. A method according to claim 1, further comprising the steps of cooling the monofilament in the final form of the coupling elements and then discharging the same from the die wheel.

3. A method according to claim 1, further comprising the step of bending opposite upper end portions of the parallel legs of the U-shaped coupling element blanks laterally outwardly away from each other to form raised connecting portions immediately subsequently to said compressing.

4. An apparatus for forming a row of continuous zigzag coupling elements for slide fasteners from a monofilament of thermoplastic synthetic resin, said apparatus comprising:

(a) a frame;

(b) a die wheel mounted on said frame for rotation and having an annular groove in its peripheral surface, and a pair of rows of circumferentially staggered pins disposed one row on each side of said annular groove;

(c) a winding unit disposed in confronting relation to said peripheral surface of said die wheel for winding the monofilament alternately around said pins across said annular groove in a zigzag form;

(d) a bending unit disposed in confronting relation to said peripheral surface of said die wheel and spaced circumferentially from said winding unit in the direction of rotation of said die wheel for forcing the zigzag monofilament into said annular groove so as to shape the same into a row of folded U-shaped zigzag coupling element blanks having parallel legs interconnected at their lower ends by lower connecting portions;

(e) a punching unit disposed in confronting relation to said peripheral surface of said die wheel and spaced circumferentially from said bending unit in the direction of rotation of said die wheel for compressing the lower connecting portions of the U-shaped coupling element blanks into the shape of coupling heads to thereby put the coupling element blanks in a final form of the coupling elements;

(f) an interior heater disposed within said die wheel for heating the latter such that, throughout the coupling element formation, the whole of said die wheel remains at a predetermined temperature slightly lower than the temperature at which the monofilament is deformable; and (g) an exterior heater disposed between said bending unit and said punching unit in confronting relation to said peripheral surface of said die wheel for additionally heating said die wheel locally such that the temperature of the monofilament in the form of U-shaped coupling element blanks rises to a characteristic heat setting temperature of the thermoplastic synthetic resin of the monofilament.

5. An apparatus according to claim 4, further comprising a cooling unit disposed in confronting relation to said peripheral surface of said die wheel and spaced circumferentially from said punching unit for cooling the monofilament in the final form of the coupling elements immediately before the coupling elements are discharged from said die wheel.

6. An apparatus according to claim 4, further comprising a hammering unit disposed in confronting relation to said peripheral surface of said die wheel and spaced circumferentially from said punching unit for bending opposite upper end portions of the parallel legs of the U-shaped coupling element blanks laterally outwardly away from each other to form raised connecting portions.

7. An apparatus according to claim 4, said interior heater including a low-frequency electromagnetic induction coil.

8. An apparatus according to claim 4, said interior heater including an electric heater.

9. An apparatus according to claim 4, said interior heater including a heat-medium circulating heater.

10. An apparatus according to claim 4, said interior heater being fixedly mounted on said frame and being accomodated within a cavity of said die wheel.

11. An apparatus according to claim 4, said exterior heater including a blast pipe for heated air, and a cover of generally C-shaped cross section connected to said blast pipe and enclosing a portion of said peripheral surface, said cover being closed at one end adjacent to said punching unit and open at the other end adjacent to said bending unit so that the heated air introduced from said blast pipe flows from the punching-unit end to the bending-unit end.

12. An apparatus according to claim 5, said cooling unit including a blast pipe for outside air, and a cover of generally C-shaped cross section connected to said blast pipe and enclosing a portion of said peripheral surface, said cover being closed at one end adjacent to a discharging station and open at the other end adjacent to said punching unit so that the outside air introduced from said blast pipe flows from the discharging-station end to the punching-unit end.

* * * * *